US012339626B2

(12) United States Patent
Schaller

(10) Patent No.: US 12,339,626 B2
(45) Date of Patent: Jun. 24, 2025

(54) BEZEL FOR A TIMEPIECE

(71) Applicant: Omega SA, Bienne (CH)

(72) Inventor: Philippe Schaller, Delémont (CH)

(73) Assignee: OMEGA SA, Bienne (CH)

(*) Notice: Subject to any disclaimer, the term of this patent is extended or adjusted under 35 U.S.C. 154(b) by 414 days.

(21) Appl. No.: 17/868,184

(22) Filed: Jul. 19, 2022

(65) Prior Publication Data

US 2023/0075218 A1 Mar. 9, 2023

(30) Foreign Application Priority Data

Sep. 6, 2021 (EP) .................................... 21195119

(51) Int. Cl.

| | |
|---|---|
| ***G04B 19/28*** | (2006.01) |
| ***G04B 19/32*** | (2006.01) |
| ***G04B 37/00*** | (2006.01) |
| ***G04B 39/02*** | (2006.01) |

(52) U.S. Cl.

CPC ........... *G04B 19/283* (2013.01); *G04B 19/32* (2013.01); *G04B 39/02* (2013.01); *G04B 37/0033* (2013.01); *G04B 37/0041* (2013.01)

(58) Field of Classification Search

CPC ...... G04B 19/283; G04B 19/32; G04B 39/02; G04B 37/0033; G04B 37/0041; G04B 49/00; G04B 49/02; G04B 19/30

See application file for complete search history.

(56) References Cited

U.S. PATENT DOCUMENTS

2019/0271954 A1* 9/2019 Silvant .................. G04G 21/04

FOREIGN PATENT DOCUMENTS

| | | | | |
|---|---|---|---|---|
| CH | 713609 | A2 * | 9/2018 | ......... C04B 41/0036 |
| EP | 0 106 806 | A1 | 4/1983 | |
| EP | 2 380 864 | A1 | 10/2011 | |
| EP | 3 141 969 | A1 | 3/2017 | |
| EP | 3 537 230 | B1 | 3/2021 | |
| JP | 59-133396 | A | 7/1984 | |
| JP | 2018-526652 | A | 9/2018 | |
| WO | WO-9739386 | A1 * | 10/1997 | ........... G04B 19/283 |

OTHER PUBLICATIONS

Ball Watch. (2017b, Aug. 25). Ball engineer hydrocarbon aerogmt II watch. aBlogtoWatch. https://www.ablogtowatch.com/ball-engineer-hydrocarbon-aerogmt-ii-watch/ (Year: 2017).*

Pina, Z. (Nov. 15, 2018). Zodiac Sea Wolf "Topper edition" series ii watches designed by Eric Singer. aBlogtoWatch. https://www.ablogtowatch.com/zodiac-sea-wolf-topper-edition-watches-designed-eric-singer/ (Year: 2018).*

(Continued)

*Primary Examiner* — Regis J Betsch
*Assistant Examiner* — Michael James Walker
(74) *Attorney, Agent, or Firm* — Sughrue Mion, PLLC

(57) ABSTRACT

A bezel (1) for a timepiece, including an annular slot (2) with a bottom (20) and two walls (21, 22), wherein a ring made of a luminescent material (3) is disposed on the bottom, the ring (3) being topped by a second ring (4) made of a mineral material occupying the volume of the slot. The bezel (1) includes in each of the two walls (21, 22) a seal (5, 5') cooperating with the second ring (4).

8 Claims, 1 Drawing Sheet

(56) References Cited

OTHER PUBLICATIONS

Ball Watch. (2017b, Aug. 25). Ball engineer hydrocarbon aerogmt II watch. aBlogtoWatch. https:/Awww.ablogtowatch.com/ball-engineer-hydrocarbon-aerogmt-ii-watch/ (Year: 2017).*
Pina, Z. (Nov. 15, 2018). Zodiac Sea Wolf "Topper edition" series ii watches designed by Eric Singer. aBlogtoWatch. https://www.ablogtowatch.com/zodiac-sea-wolf-topper-edition-watches-designed-eric-singer/ (Year: 2015).*
European Search Report for EP 21 19 5119 dated Jan. 27, 2022.
Ariel Adams, "Blancpain Fifty Fathoms Automatique 5015 Watch Review," A Blog to Watch, Feb. 3, 2014 (12 pages total), https://www.ablogtowatch.com/blancpain-fifty-fathoms-5015-watch-review/.

* cited by examiner

BEZEL FOR A TIMEPIECE

CROSS REFERENCE TO RELATED APPLICATIONS

This application claims priority to European Patent Application No. 21195119.9 filed Sep. 6, 2021.

TECHNICAL FIELD OF THE INVENTION

The invention relates to a bezel for a timepiece.

PRIOR ART

In the field of watches comprising a watch case provided with a middle, it is known to provide for an element provided with at least one luminous index over the middle. In the case of a diving watch, the element is, for example, a rotating bezel, and the index allows, for example, indicating a reference position for the measurement, by the diver, of his time of immersion in the sea. For this purpose, the diver rotates the bezel so as to align the index with the minute hand. This position then becomes the reference for measuring the elapsed time. One of the main criteria of effectiveness of a diving watch should be the readability of the hour and of the index during the immersion phase.

In order to address this constraint, a known solution consists in covering the index of the bezel, as well as the hands of the watch, with a phosphorescent material. This allows making the index and the hands visible in low-luminosity conditions, typically a few meters under water. For example, such a diving watch is described in the patent application FR 1 572 837 A. Nonetheless, a drawback of this solution is that it requires changing the entire bezel once the phosphorescent material is consumed. Moreover, such a solution generally requires placing the indications at the bezel surface which exposes them to impacts and frictions and irreparably damages them.

SUMMARY OF THE INVENTION

The invention aims to overcome the drawbacks of the prior art by suggesting providing a bezel system provided with a luminescent motion-work which is simple to mount, tight and secure.

To this end, the invention relates to a bezel which comprises the features mentioned in the independent claim 1.

Particular embodiments of the watch are defined in the dependent claims 2 to 8.

The invention further relates to a timepiece comprising a case comprising a middle closed by a bottom and a glass and provided with a bezel, and a bezel according to one of the preceding claims.

BRIEF DESCRIPTION OF THE FIGURES

The aims, advantages and features of the watch according to the invention will appear better in the following description based on at least one non-limiting embodiment illustrated by the drawings wherein.

DETAILED DESCRIPTION OF THE INVENTION

Figure 1:
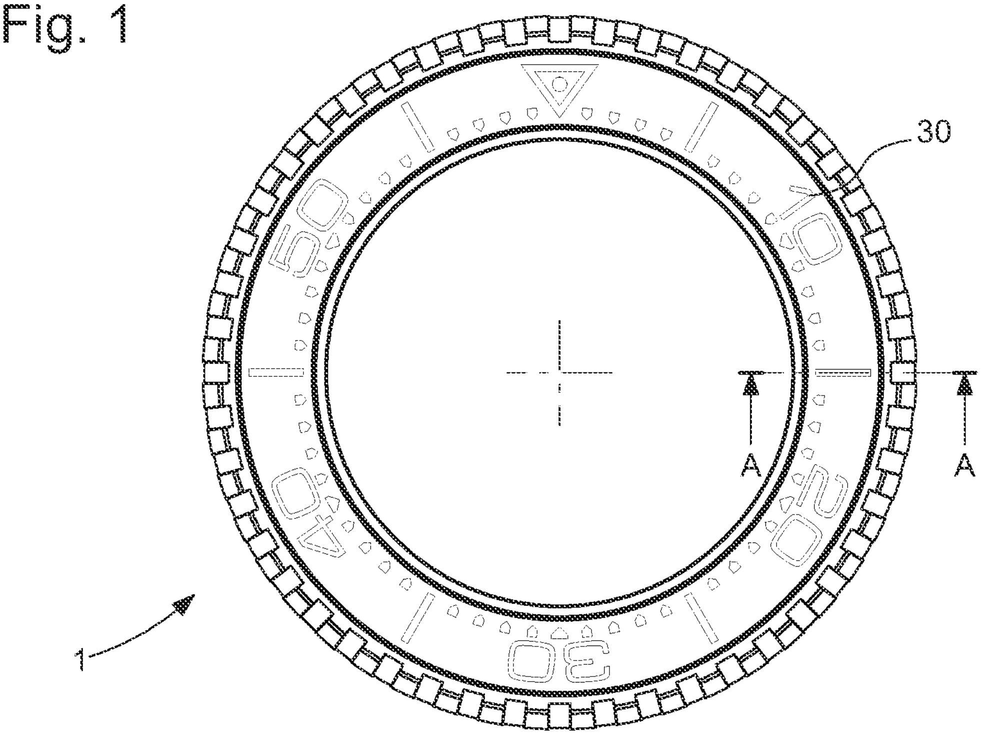
FIG. 1 is a perspective view of a bezel according to the invention.
Figure 2:
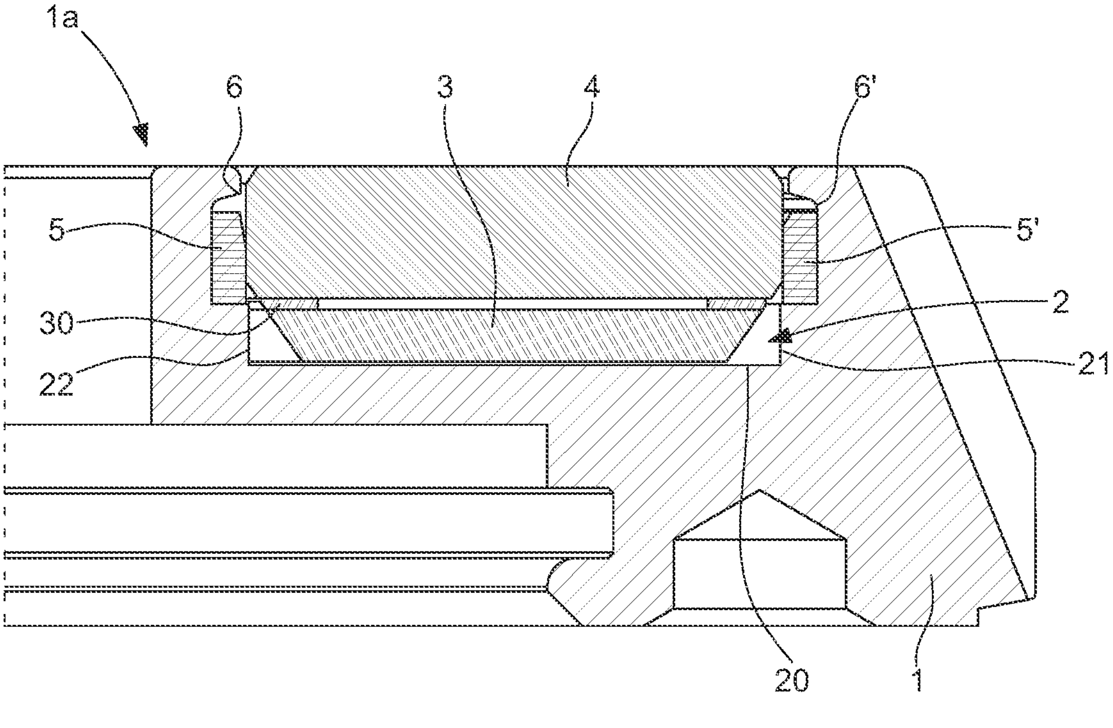
FIG. 2 is a sectional view, considered according to a section plane A-A, of the bezel of FIG. 1 according to the invention.

FIGS. 1 and 2 illustrate a bezel 1 in accordance with the invention, the bezel 1 being arranged so as to be mounted on a timepiece which comprises a case closed by a bottom and a glass. The bezel 1 is an annular-shaped part and comprises an upper face visible by the user and a lower face in direct or indirect contact with the watch case. This bezel 1 may be made of a metallic, composite or still ceramic material, and possibly of a plastic material.

The bezel 1 may be mounted, rotatably or not, at the middle. In the case of a rotating bezel, a spring-notching set or a click system is arranged. This spring-notching set comprises spring means and a toothed element. One of the elements of the spring-notching set will be angularly secured to the middle while the other one will be angularly secured to the bezel 1 so as to enable the angular indexing of the bezel with respect to the middle.

For mounting the bezel 1, the timepiece comprises, in a known manner, a middle in which a shoulder is arranged, this shoulder being defined by a lateral wall and a base. This shoulder serves as a housing for the bezel. In general, the lateral wall comprises an excrescence extending over the entirety of the perimeter of the lateral wall. This excrescence allows defining, in cooperation with the base and the wall, a retaining groove. During the forced assembly of the bezel, this retaining groove allows inserting the latter therein and retaining it.

According to the invention, the bezel 1 has a slot 2 at the upper face 1*a*, this slot 2 being also annular i.e. extending along the upper face 1*a*, and comprising a bottom 20 and two walls 21, 22.

Advantageously, the bezel 1 serves as a housing for a ring made of a luminescent material 3 which is disposed on the bottom 20, and for a second ring made of a mineral material 4 topped by the ring made of a luminescent material 3 and occupying the remaining volume of the slot 2.

According to the invention, the bezel 1 further comprises a motion-work element. This motion-work element is in the form of a ring made of a luminescent material 3 which comprises a motion-work element 30 allowing an indication of the minutes, and whose dimensions enable it to be placed in the bottom 20 of the slot 2 of the bezel 1 as shown in FIG. 2. This ring made of a luminescent material 3 may be made of a plastic or metallic or organic material such as wood or of a crystalline material such as sapphire or ruby or ceramic. Motion-work indices are then formed in relief, i.e. as an excess thickness, on the surface of the ring 3. The ring made of a luminescent material 3 is in the form of a crown with a circular or trapezoidal section as illustrated in FIG. 2.

According to an advantageous embodiment, the motion-work marking on the bezel 1 is made in the form of metallisations forming indices. It is also possible to imagine hollows formed in the ring made of a luminescent material 3 and then filled with ink or a metal.

Advantageously, the second ring 4 is made of a transparent mineral material so as to allow observing the motion-work throughout the second ring 4. Hence, the second ring 4 is mounted in the slot 2, above the ring made of a luminescent material 3. The second ring 4 is in the form of an annular ring with a rectangular section and whose dimensions enable it to be placed in the slot 2 so that the latter is flush with the upper surface of the bezel 1.

The mineral material forming the second ring is selected from among: glass, sapphire, ruby, ceramic.

According to the invention, the slot comprises, on each of the walls 21, 22, a groove 6, 6' which is arranged so as to receive a toric-shaped seal 5, 5', so as to ensure sealing of the slot and avoid that dust or liquids deposit over the ring made of a luminescent material 3. The height of the grooves is similar to the height of the second ring 4, which allows having a thicker/higher seal 5 and thus a better sealing. The second ring 4 also has chamfers at the upper and lower edges to facilitate insertion and avoid damaging the seal.

As this could be observed in FIG. 2, the top portion of the groove 5, 5' is slightly chamfered so as not to pinch the seal and damage it during the insertion of the second ring 4.

During the assembly of the bezel 1, the ring made of a luminescent material 3 is inserted at first against the bottom 20 of the slot 2, then each seal 5, 5 is then placed in a corresponding groove 6, 6'. Finally, the second ring 4 is forcibly inserted into the slot 2 over the ring made of a luminescent material 3. Thus, the whole is held assembled thanks to the frictional forces between the seals 5, 5 and the second ring 4, the seals 5, 5' also serving as a sealing element.

It should be understood that various modifications and/or improvements and/or combinations obvious to a person skilled in the art could be made to the different embodiments of the invention exposed hereinabove without departing from the scope of the invention defined by the appended claims.

The invention claimed is:

1. A bezel for a timepiece, comprising:

an annular slot comprising a bottom wall, a first side wall, and a second side wall, a first ring made of a luminescent material is disposed on the bottom wall;

a second ring made of a mineral material, disposed on top of the first ring and occupying the volume of the slot, and a first seal disposed in the first side wall and a second seal disposed in the second side wall, the first seal and the second seal each cooperating with the second ring to seal the annular slot, wherein, of the first ring and the second ring only the first ring comprises a motion-work element allowing an indication of minutes.

2. The bezel according to claim 1, wherein the mineral material forming the second ring is a transparent material.

3. The bezel according to claim 1, wherein a top surface of the second ring is flush with the surface of the bezel.

4. The bezel according to claim 1, wherein the first side wall comprises a first groove configured to receive the first seal, and wherein the second side wall comprises a second groove configured to receive the second seal.

5. The bezel according claim 1, wherein the seals are O-rings.

6. The bezel according to claim 1, wherein the motion-work element is made in the form of metallisations forming indices.

7. The bezel according to claim 1, wherein the mineral material forming the second ring is selected from the group consisting of glass, sapphire, and ruby.

8. A timepiece comprising a case comprising a middle closed by a bottom and a glass and provided with the bezel according to claim 1.

* * * * *